US006382570B1

(12) United States Patent
Simpson et al.

(10) Patent No.: US 6,382,570 B1
(45) Date of Patent: May 7, 2002

(54) ADJUSTABLE HANGAR

(76) Inventors: Dennis Simpson, 152 Fireside Dr., Bozeman, MT (US) 59718; Buck Dolan, 604 Mantle Dr. Apt. B, Belgrade, MT (US) 59714

( * ) Notice: Subject to any disclaimer, the term of this patent is extended or adjusted under 35 U.S.C. 154(b) by 0 days.

(21) Appl. No.: 09/479,936

(22) Filed: Jan. 10, 2000

(51) Int. Cl.[7] .................................................. F16L 3/08
(52) U.S. Cl. ........................ 248/74.3; 24/16 PB; 248/62
(58) Field of Search ............................. 248/56, 62, 63, 248/74.3, 74.4, 68.1, 74.1; 24/16 PB, 17 AP, 30.5 P

(56) References Cited

U.S. PATENT DOCUMENTS

| | | | |
|---|---|---|---|
| 3,022,557 A | * 2/1962 | Logan ........................ 248/74.3 |
| 3,602,960 A | 9/1971 | Urbigkeit et al. ........ 24/249 LS |
| 4,128,220 A | * 12/1978 | McNeel ..................... 24/16 PB |
| 4,272,047 A | 6/1981 | Botka ..................... 248/74 PB |
| 4,389,754 A | 6/1983 | Sohma ..................... 24/16 PB |
| 4,447,934 A | * 5/1984 | Anscher ................... 24/16 PB |
| 4,570,303 A | 2/1986 | Richmond et al. ......... 24/16 PB |
| 4,752,054 A | 6/1988 | Jönsson ........................ 248/51 |
| 4,805,856 A | 2/1989 | Nicoli et al. ............... 248/74.3 |
| 4,958,414 A | 9/1990 | Benoit ...................... 24/16 PB |
| 5,669,111 A | * 9/1997 | Rohaly ..................... 24/16 PB |
| 5,746,401 A | * 5/1998 | Condon ........................ 248/62 |
| 5,803,413 A | 9/1998 | Benoit et al. ................. 248/73 |
| 5,848,771 A | 12/1998 | Hancock-Bogese et al. ......................... 248/74.3 |
| 5,890,265 A | 4/1999 | Christian et al. ......... 24/16 PB |
| 6,149,109 A | * 11/2000 | Stankowski ............... 248/74.3 |

* cited by examiner

Primary Examiner—Ramon O. Ramirez
Assistant Examiner—Tan Le
(74) Attorney, Agent, or Firm—Morgan, Lewis & Bockius LLP

(57) ABSTRACT

A pipe hangar that can be mounted in various orientations for adjustably securing or hanging a structure at different locations can include a housing having an adjusting strip, a locking tab, and multiple and differently oriented fastener structures, e.g., voids. The locking tab can include a strip guide and a lever including a tooth stop. The adjusting strip can include connecting teeth and be disposed on a bottom portion of the housing. The adjusting strip is adapted to be looped back over itself and placed between the strip guide and the housing such that the connecting teeth on the adjusting strip can be engaged by the tooth stop on the lever to lock the adjusting strip relative to the housing. A pipe or other structure disposed in the portion of the adjusting strip that is looped back over itself can be raised or lowered relative to the housing (and the structure to which the housing is mounted) by pressing the lever to release the adjusting strip connecting teeth from the tooth stop, moving the adjusting strip to a desired positioned relative to the housing, and releasing the lever to engage the tooth stop with the connecting teeth and lock the adjusting strip relative to the housing at the desired position.

20 Claims, 5 Drawing Sheets

ADJUSTABLE HANGAR

BACKGROUND OF THE INVENTION

1. Field of the Invention

The invention relates to a hangar, and more particularly to an adjustable height pipe hangar adapted to be mounted in different orientations for adjustably securing a pipe or other structure at various locations.

2. Description of the Related Art

Flexible tie devices for fastening elongated structures, such as cables, pipes and the like, are well known in the art. Such devices usually consist of a one-piece flexible strap element which is wrapped around a set of cables or the like, and then inserted into a socket that is built into one end of the flexible strap. The socket and the flexible strap usually include mating toothed elements which can securely fasten the flexible strap within the socket. Often, the flexible tie device cannot be adjusted or loosened and must be destroyed (e.g. cut) in order to release the previously bound article.

As shown in U.S. Pat. No. 4,958,414 to Benoit (Benoit'414), it is known to use an adjustable, reusable fastener device when adjustment of the tied device is desired. Benoit'414 discloses a reusable bundle fastener that includes a resilient strap that is integral with and can be locked into an open casing. A plurality of teeth on the strap mate with a casing flange that extends downwardly from a top wall of the casing to lock the casing with respect to the strap. The top wall of the casing is movable between an open and closed position such that the strap can be selectively and adjustably locked with respect to the casing at various positions. The Benoit'414 bundle fastener includes an ear depending from the casing to permit hanging of the fastener from a wall.

Several problems exist in the conventional art. Specifically, conventional art devices cannot be secured to a mounting structure in a variety of orientations and therefore the application of the devices is limited. In addition, the cost of manufacturing the conventional art devices is high due to the complex mold geometries required and the amount of material necessary to make the conventional devices. The conventional art fails to provide an easily accessible and adjustable mechanism for releasing a locked flexible strip. The conventional art also fails to provide the combined adjustability and positionability that is desirable when hanging structures, and especially when hanging plumbing pipes.

SUMMARY OF THE INVENTION

It is an object of the invention to solve the above and other problems by providing a pipe hangar with a housing, a fastener structure located on the housing including a first fastener structure configured to enable the housing to be attachable to a mount structure at a first orientation and a second fastener structure configured to enable the housing to be attachable to a mount structure at a second orientation different from the first orientation, an adjusting strip located on the housing and having an end portion that is lockable with respect to the housing, the adjusting strip having at least one connecting tooth, and a strip locking structure disposed on the housing and having a tooth stop structure that can cooperate with the at least one connecting tooth of the adjusting strip to lock the adjusting strip with respect to the housing.

In accordance with another aspect of the invention, a method for adjustably mounting an object includes the steps of providing a hangar that includes a housing and an adjusting strip with connecting teeth, the housing having a fastener structure including a first fastener structure configured to enable the housing to be attachable to a mount structure in a first orientation, and a second fastener structure configured to enable the housing to be attachable to a mount structure in a second orientation that is different from the first orientation, and a strip locking structure disposed on the housing, determining a selected fastener structure from one of the first fastener structure and the second fastener structure to fasten the hangar to a mount structure, fastening the hangar to the mount structure using the selected fastener structure, looping the adjustable strip over itself to from a support loop portion of the adjustable strip, inserting the adjustable strip into the strip locking structure to secure the adjustable strip with respect to the housing, and supporting the object within the support loop portion of the adjustable strip.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide further understanding of the invention and are incorporated in and constitute a part of this specification, illustrate an embodiment of the invention and together with the description serve to explain the principles of the invention. In the drawings.

DETAILED DESCRIPTION OF A PREFERRED EMBODIMENT

Figure 1:
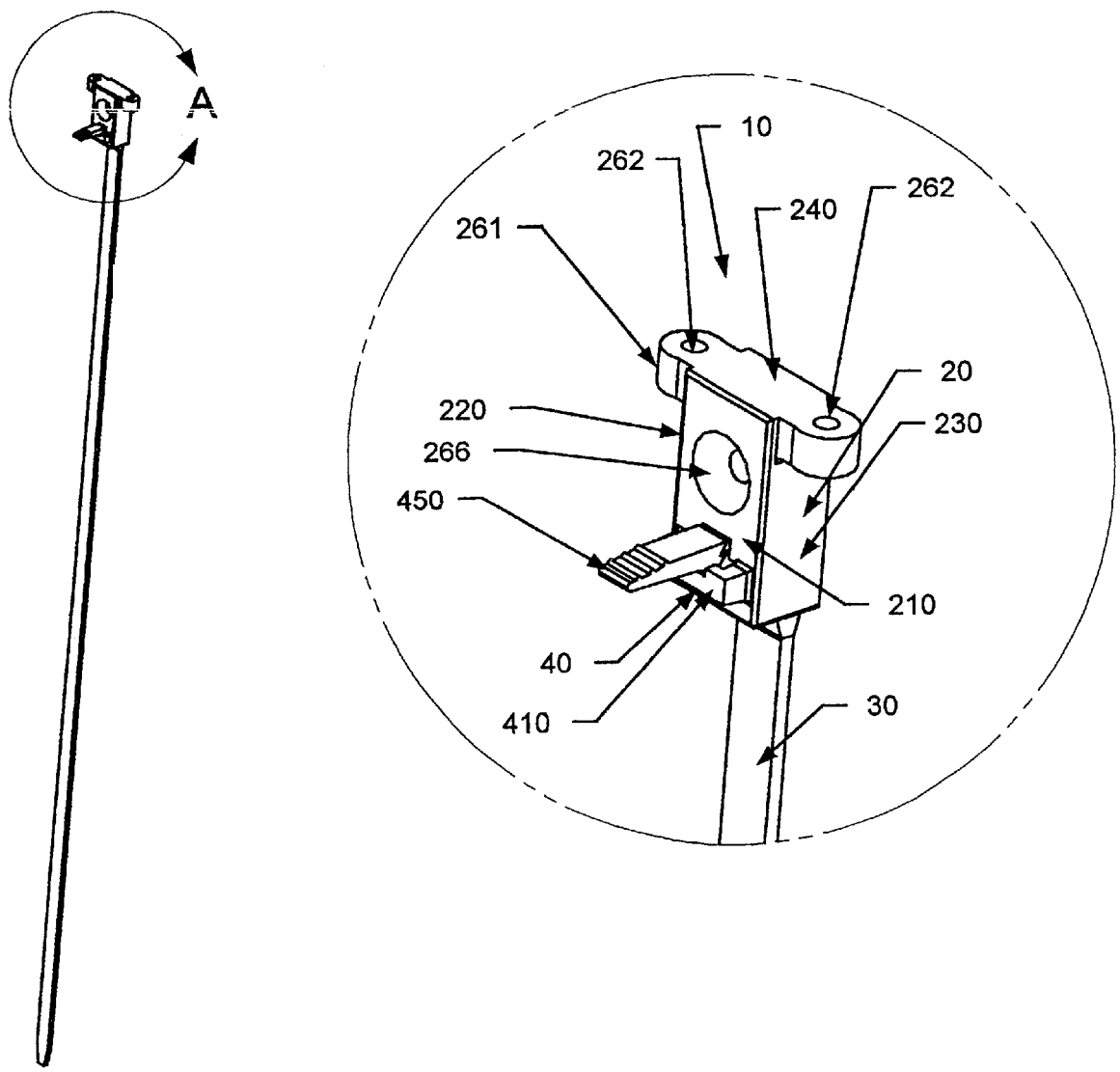
FIG. 1 shows a front isometric view of an adjustable pipe hangar made in accordance with the principlese of the invention.

Reference will now be made in detail to a preferred embodiment of the invention, an example of which is illustrated in the drawings.

Figure 2:
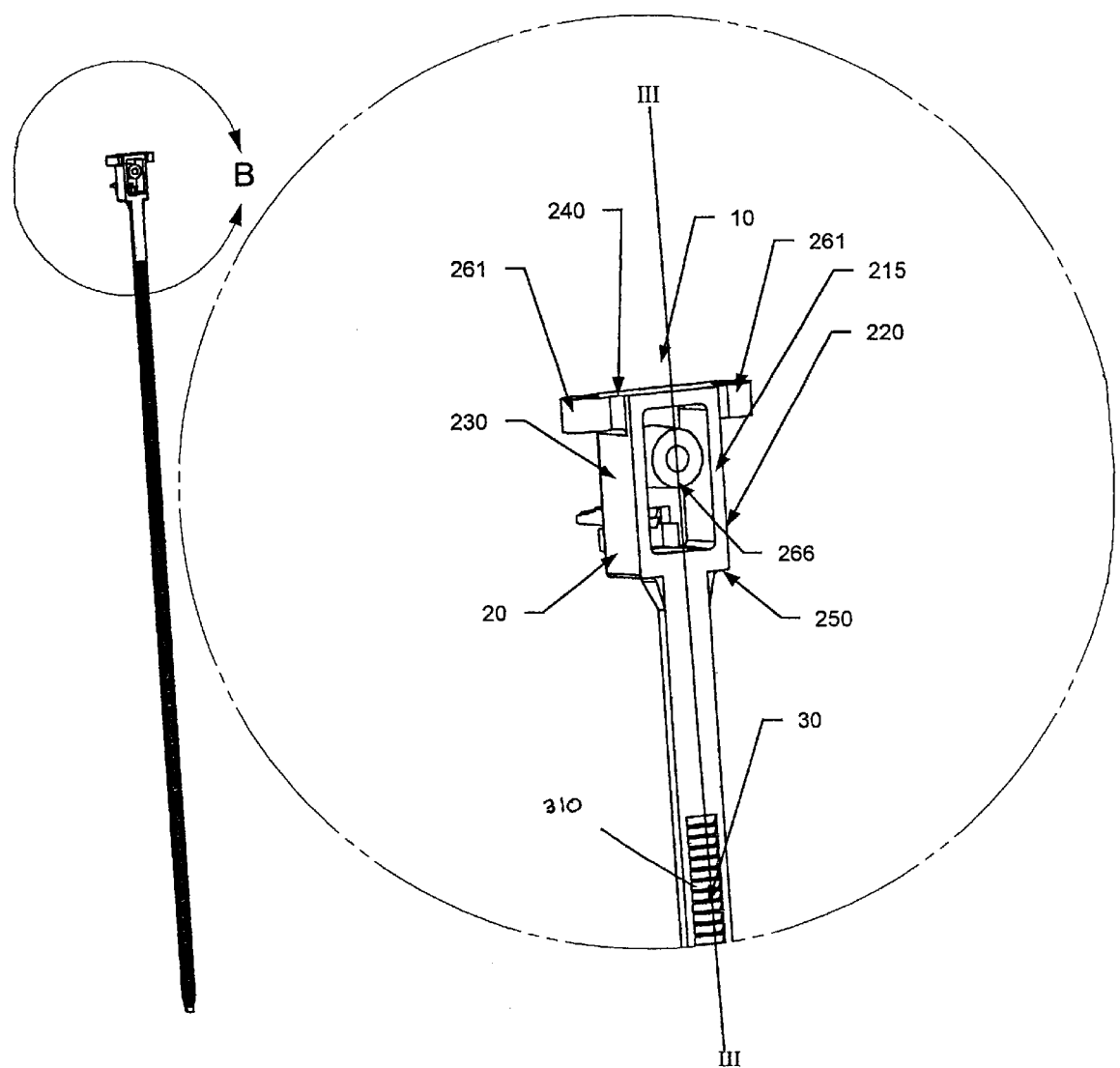
FIG. 2 shows a rear isometric view of the pipe hangar of FIG. 1.

As shown in FIGS. 1 and 2, a pipe hangar device 10 can include a housing 20 and an adjusting strip 30. The pipe hangar device 10 can be disposed on a mount structure 600 through the use of fastener structures 261, 266 located on the housing 20. A pipe or other hanging 15 structure can be adjustably positioned and supported by the pipe hangar device 10 by. looping the adjusting strip back over itself and locking it to the housing 20 using an adjusting lock 450 located on the housing 20. The mounting of the pipe hangar device 10 to the mount structure 600 and the adjustment of the position of the pipe will be described in more detail later.

The housing 20 preferably includes a front face 210, a rear face 215, a left face 220, a right face 230, a top face 240, and a bottom face 250. The left face 220 can be substantially parallel to the right face 230 and the top face 240 can be substantially parallel to the bottom face 250.

The housing 20 can also include a fastening structure for securing the housing to a mount structure 600. The fastening structure can include a vertical fastener protrusion 261 that is sized, shaped, located, and/or oriented such that the pipe hangar device 10 can be mounted on a desired mount surface in a first particular configuration/orientation. The top surface of the vertical fastener protrusion 261 can be substantially flush with the top face 240 of the housing 20. A fastener void 262 located in the vertical fastener protrusion 261 allows a fastener to pass through the housing 20. The housing 20 can also include a second vertical fastener protrusions 261 substantially flush with the top face 240 of the housing 20. The first and second vertical fastener protrusions 261 can be located on the left and right faces, respectively, of the housing 20 and include a fastener void 262 running therethrough. By this arrangement, the pipe hangar device 10 can be securely attached to a mount surface in the first configuration by fasteners that pass through the fastener voids 262.

The fastening structure for the pipe hangar device 10 can also include a horizontal fastener, such as a horizontal fastener void 266. The horizontal fastener void 262 can include a counter-sink, a counter-bore, or a combination of counter-sinks and counter-bores. Preferably, the horizontal fastener void 266 has a countersink and is located substantially through the front face 210 of the housing 20. By this arrangement, the pipe hangar 10 can be mounted to a mount surface in a second configuration that is approximately 90 degrees different from the above-described first configuration.

A strip locking structure 40 can be disposed on the housing 20 and include a strip guide 410 and an adjusting lock 450. The strip guide 410 and the adjusting lock 450 are sized shaped, located, and oriented such that the adjusting strip 30 can be looped back over itself and inserted under the strip guide 410 and adjusting lock 450. The strip locking structure 40 is disposed on the front face 210 of the housing 20, substantially closer to the bottom face 250 than to the top face 240.

Figure 3:
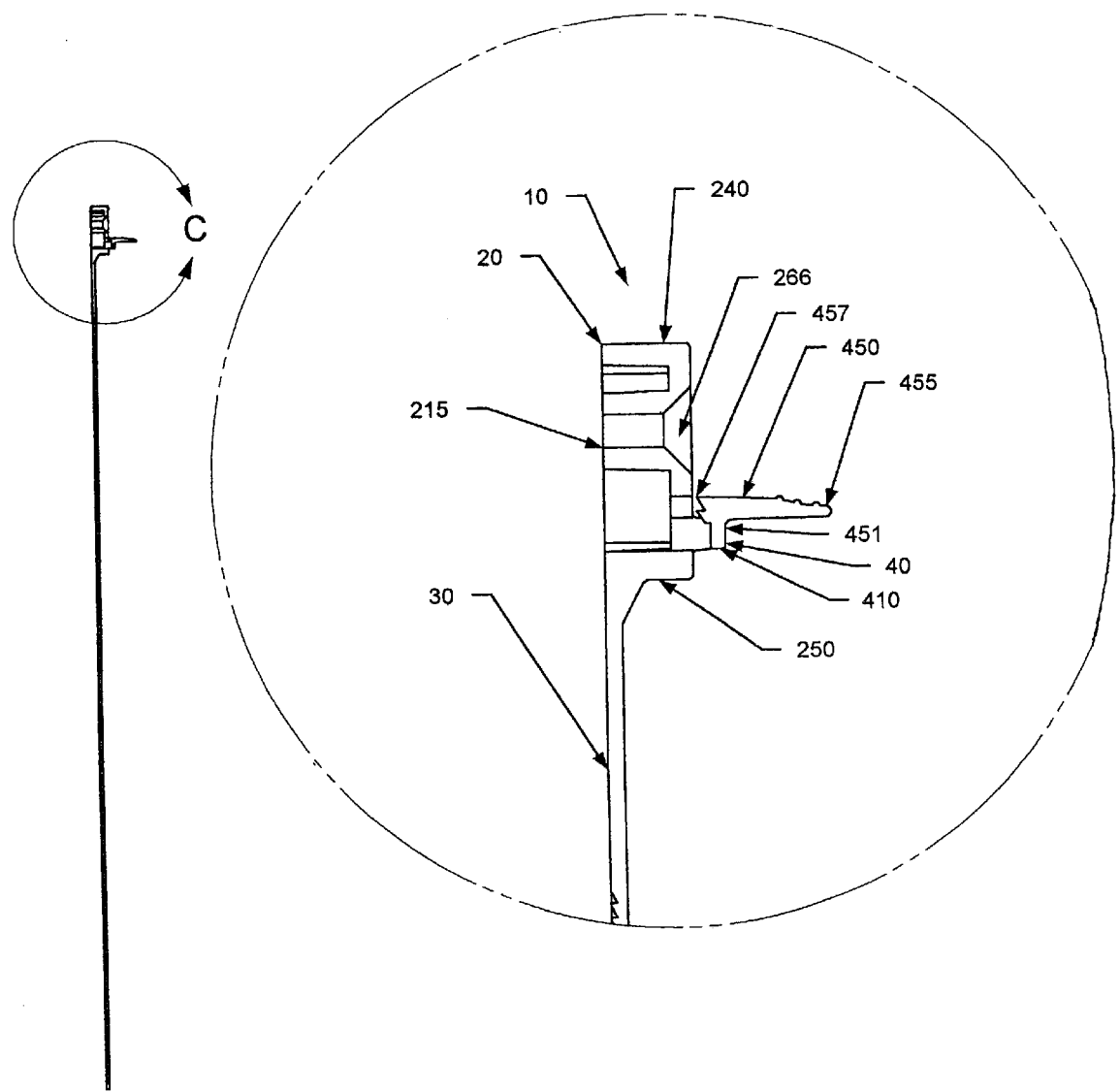
FIG. 3 shows a cross sectional view taken along line III—III of the pipe hangar of FIG. 2.
Figure 4:
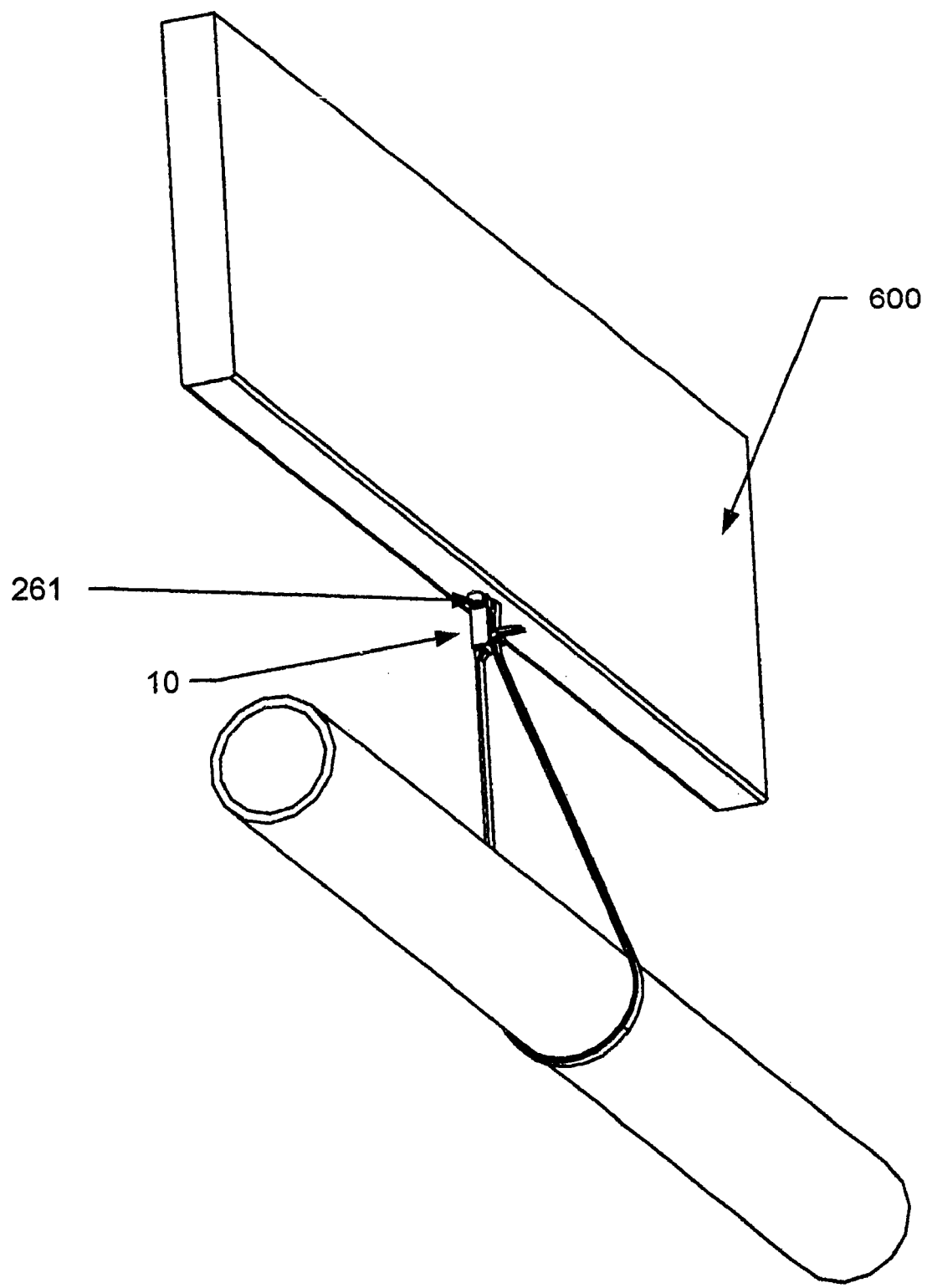
FIG. 4 shows the pipe hangar of FIG. 1 mounted via a first fastener structure to a mount structure.

As shown in FIG. 3, the adjusting lock 450 can include a connection portion 451, a lever portion 455, and a tooth portion 457. The connection portion 451 connects the adjusting lock 450 to the strip guide 410 to form the strip locking structure 40. The connection portion 451 must be sized, shaped, located and oriented in a manner such that the tooth portion 457 of the adjusting lock 450 can be located adjacent and in selectable contact with connecting teeth 31 0 on the adjusting strip 30. Preferably, the connection portion 451 biases the tooth portion 457 toward the adjusting strip 30 when the adjusting strip 30 is disposed within the strip guide 410. The connection portion 451 can be configured to allow the tooth portion 457 to substantially disengage the adjusting strip 30 when a desired force is applied to the lever portion 455 of the adjusting lock 450.

The adjusting strip 30 can be releasably and adjustably connected to a face of the housing 20 by the above described strip locking structure 40. The size and shape of the adjusting strip 30 is selected such that a pipe or other structure can be adequately supported by the adjusting strip 30 and the housing 20 in an adjustable manner. The adjusting strip 30 can be substantially thin and flexible with a substantially rectangular cross section. Preferably, the adjusting strip is disposed on the bottom face 250 of the housing 20.

The adjusting strip 30 can include a plurality of connecting teeth 310 that are configured such that the tooth portion 457 of the adjusting lock 450 can substantially engage the connecting teeth 310 to selectively lock the adjusting strip 30 relative to the housing 20. The connecting teeth 310 can be disposed on a single side of the adjusting strip 30, and sized and shaped to provide an engagement strength sufficient to support a pipe or other structure located within the looped adjusting strip 30.

Figure 5:
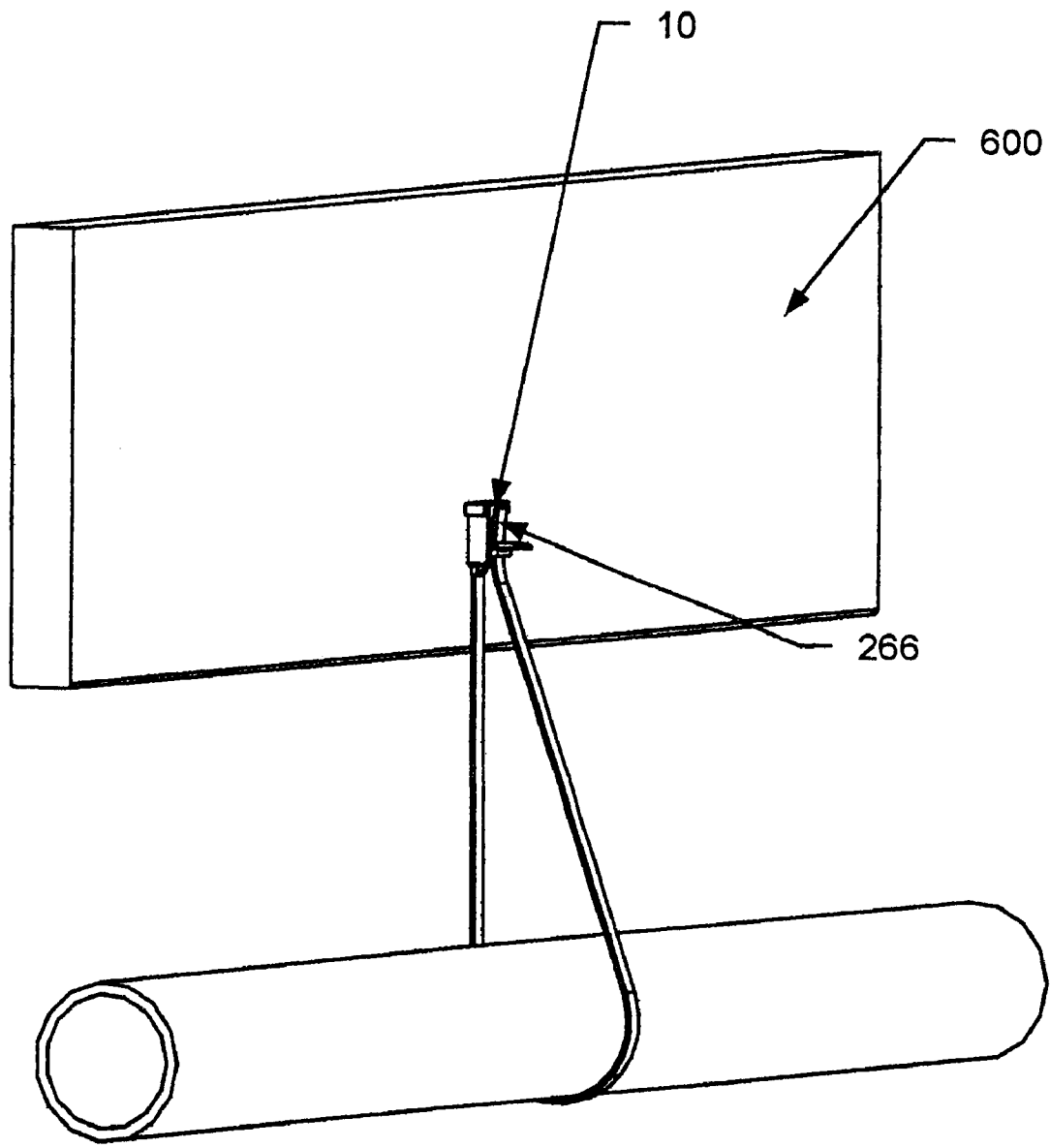
FIG. 5 shows the pipe hangar of FIG. 1 mounted via a second fastener structure to a mount structure.

The operation of the pipe hangar device 10 will now be explained. FIG. 5 shows the pipe hangar device of the invention mounted through the fastener voids 262 in the vertical fastener protrusions 261. FIG. 6 shows the pipe hangar device of the invention mounted through the horizontal fastener void 266. Initially, a position on a desired mounting surface is chosen. The pipe hangar device 10 can then be mounted with fasteners through the fastener voids 262 of the vertical fastener protrusions 261 (the first configuration), or alternately with a fastener through the horizontal mont void 266 (the second configuration). The adjusting strip 30 is looped back over itself to form a support loop or cradle configuration around a pipe or other structure that is to be supported. A free end of the adjusting strip 30 can be inserted between the strip guide 410 and the front face 210 of the housing 20 such that the connecting teeth 310 are engageable with the tooth portion 457 of the adjusting lock 450. The free end of the adjusting strip 30 can be pulled in a tightening direction though the strip guide 410 such that a perimeter of the loop portion of the adjusting strip is substantially decreased in length. The connecting teeth 310 are configured such that they "ratchet over" the tooth portion 457 when the adjusting strip 30 is moved in the tightening direction. Thus, the perimeter of the loop can be substantially decreased without operation of the adjusting lock 450. By this arrangement, a pipe disposed within the loop can be raised (disposed relatively closer to the housing 20 of the pipe hangar assembly 10). Alternately, the pipe may be lowered (disposed relatively farther from the housing 20 of the pipe hangar assembly 10) by applying sufficient force to lever portion 455 of the adjusting lock 450 such that the tooth portion 457 disengages from the connecting teeth 310 of the adjusting strip 30. While sufficient force is applied to the lever 455, the adjusting strip can be moved in a loosening direction such that the perimeter of the loop formed by the adjusting strip 30 and the housing 20 can be substantially increased. The adjusting strip 30 can be adjustably locked relative to the housing 20 by removing the force applied to lever portion 455 to allow the tooth portion 457 to engage the connecting teeth 301 at a desired location.

While the invention has been illustrated in detail and with reference to a specific embodiment thereof, it will be apparent to one skilled in the art that various changes and modifications can be made therein without departing from the spirit and scope thereof. Thus, it is intended that the invention cover the modifications and variations of this invention as would be apparent to those skilled in the art.

For example, the pipe hangar device 10 may be constructed from a variety of materials which satisfy the strength and flexibility requirements for the device. The material and specific configuration of the device are selected with consideration to ease of manufacture, cost of manufacture, desired strength, desired weight, desired flexibility and like attribultes, and/or combinations of one or more of these attributes or like attributes defining similar desired properties. The materials used in constructing the device can include, but are not limited to, plastics, rubbers, nylon composites, and like materials, and/or combinations of one or more of these materials or like materials. Preferably, the pipe hangar device 10 consists of nylon.

Different configurations for the housing 20 are also contemplated by this invention. The housing 20 can have any number of faces defining a variety of shapes, including circles, triangles, rectangles, polyhedrons, and like shapes. The location of the strip locking structure 40 can also be at various locations other than the lower front face 210 of the housing 20. For example, a particular application may require that the strip locking structure 40 be placed on the rear face 215 and towards the top of the housing 20. The housing can be configured to be attached to many different surfaces, including mount beams, floors, walls, cabinets, walls, etc.

The adjusting strip 30 can have a cross-section that is circular, oval, rectangular, etc., and remain within the spirit of the invention. In addition, the connecting teeth 310 on the adjusting strip 30 are preferably triangular in cross-section, but can be square or other shapes provided they can adequately lock with the tooth surface 457 of the strip locking structure 40.

It is also within the scope of the invention to provide a first fastening structure and a second fastening structure on the housing that are oriented with respect to each other such that the hangar can be mounted in various positions other than horizontally or vertically. For example, the longitudinal axis of the fastener voids (holes) 261 and 266 can be at an angle substantially different than 90 degrees. In addition, the fastener structure can include nails, rivets or screws instead of the fastener voids 261, 266 for securing the hangar to a mount structure.

The locking tab can also include several different configurations (either adjustable or non-adjustable) that fall within the scope of the invention, provided they are able to adequately secure the pipe or other object.

We claim:

1. A pipe hangar, comprising:
    a housing having a fastener structure, said fastener structure including a first fastener structure configured to enable said housing to be attachable to a mount structure in a first orientation and a second fastener structure configured to enable said housing to be attachable to the mount structure in a second orientation that is different from said first orientation in at least two dimensional directions;
    an adjusting strip disposed on said housing and having an end portion that is lockable with respect to said housing, said adjusting strip including at least one connecting tooth; and
    a strip locking structure disposed on said housing, said strip locking structure having a tooth stop structure that cooperates with said at least one connecting tooth to lock said adjusting strip with respect to said housing.

2. The pipe hangar according to claim 1, wherein said first fastener structure includes at least a primary fastener void having a primary longitudinal axis.

3. The pipe hangar according to claim 2, wherein said second fastener structure includes at least a secondary fastener void having a secondary longitudinal axis that is angled at an angle different than zero degrees with respect to said primary longitudinal axis.

4. The pipe hangar according to claim 3, wherein said angle is substantially ninety degrees.

5. The pipe hangar according to claim 1, wherein said first fastener structure includes at least one fastener protrusion having at least a primary fastener void.

6. The pipe hangar according to claim 1, wherein said second fastener structure includes a secondary fastener void.

7. The pipe hangar according to claim 1, wherein said adjusting strip is disposed on a bottom surface of said housing.

8. The pipe hangar according to claim 1, wherein the pipe hangar consists of nylon.

9. The pipe hangar according to claim 1, wherein said strip locking structure includes a lever having a contact portion and a base portion flexibly connected to said housing, said tooth stop structure being located at said base portion of said lever such that said adjustable strip can be locked relative to said housing when said at least one connecting tooth is in engagement with said tooth stop structure and can be released from said housing when a predetermine force is applied to said contact portion of said lever to cause said lever to flex with respect to said housing and release said at least one connecting tooth from said tooth stop structure.

10. The pipe hangar according to claim 1, wherein said housing includes a front face surface and a rear face surface and said second fastener structure and said strip locking structure are located on said front face surface of said housing.

11. The pipe hangar according to claim 1, wherein said housing further includes a left side surface, a right side surface, and a bottom surface, and said first fastener structure is located on one of said left side surface and said right side surface and said adjustable strip is located on said bottom surface of said housing.

12. A method for adjustably mounting an object, comprising the steps of:
    providing a hangar that includes a housing and an adjusting strip with connecting teeth, said housing having a fastener structure including a first fastener structure configured to enable said housing to be attachable to a mount structure in a first orientation, and a second fastener structure configured to enable said housing to be attachable to a mount structure in a second orientation that is different from said first orientation, and a strip locking structure disposed on said housing;
    determining a selected fastener structure from one of said first fastener structure and said second fastener structure to fasten said hangar to a mount structure;
    fastening said hangar to said mount structure using the selected fastener structure;
    looping said adjustable strip over itself to from a support loop portion of said adjustable strip;
    inserting said adjustable strip into said strip locking structure to secure said adjustable strip with respect to said housing; and
    supporting the object within said support loop portion of said adjustable strip.

13. The method for adjustably mounting an object according to claim 12, further comprising the step of:
    unlocking said strip locking structure and moving said adjusting strip relative to said housing to adjust the position of the object located within said loop portion of said adjusting strip.

14. The method for adjustably mounting an object according to claim 12, wherein said step of determining includes determining whether to fasten said housing to a mount structure in one of a first orientation and a second orientation, said first orientation being different from said second orientation.

15. The method for adjustably mounting an object according to claim 12, wherein said first fastener structure and said second fastener structure include a first hole and a second hole, respectively, and said first hole has a longitudinal axis that is substantially perpendicular to the longitudinal axis of said second hole.

16. The method for adjustably mounting an object according to claim 12, wherein said first fastener structure includes two vertical fastener protrusions.

17. The method for adjustably mounting an object according to claim 12, wherein the object is a pipe.

18. The method for adjustably mounting an object according to claim 17, wherein said mount structure is one of a support beam and a wall.

19. The method for adjustably mounting an object according to claim 12, wherein said step of determining includes determining whether to attach said hangar on a vertically oriented surface or a horizontally oriented surface.

20. The method for adjustably mounting an object according to claim 12, wherein said hangar is constructed as an integral, one piece structure.

* * * * *